April 21, 1959
K. A. ROSS
2,882,603
GEOMETRIC INSTRUMENT
Filed March 18, 1957
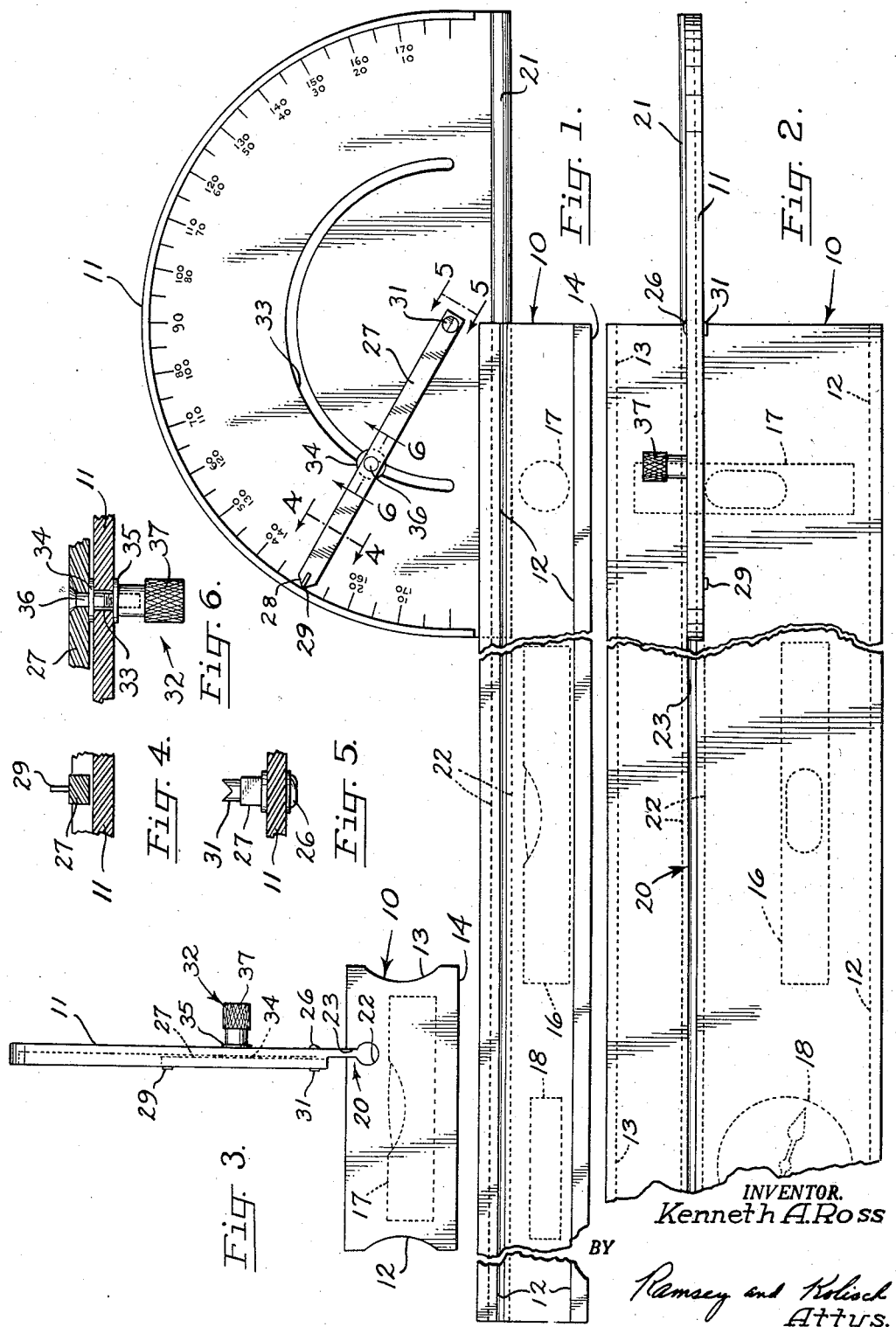
INVENTOR.
Kenneth A. Ross
BY
Ramsey and Kolisch
Attys.

United States Patent Office 2,882,603
Patented Apr. 21, 1959

2,882,603

GEOMETRIC INSTRUMENT

Kenneth A. Ross, Tillamook, Oreg.

Application March 18, 1957, Serial No. 646,860

1 Claim. (Cl. 33—64)

This invention relates to a geometric measuring instrument and more particularly to an improved instrument for measuring angles, pitches, slopes, and the like, such measurements being desirable, for example, in computing distances and laying out constructions such as roads, buildings, etc.

It is a principal object of this invention to provide a novel instrument for making angular measurements which is characterized by a simple and an inexpensive construction and which is easy to manipulate and has a wide range of utility.

The measuring instrument of this invention, in general, comprises an elongated base or supporting member and a scale or protractor member slidably mounted on the base member for movement longitudinally therealong. The base or supporting member includes a pair of level indicators or spirit levels mounted in the base member so as to indicate true horizontal and vertical positioning of the base member. Preferably, a compass is also mounted in the base member to assist the user of the instrument in the preparation of plats or maps.

The scale or protractor member is comprised of transparent material, preferably a transparent plastic capable of withstanding shocks and jarring without shattering, and projects from the base member in a plane extending longitudinally along the base member. Carried on the protractor member is an indicator arm mounted for pivotal movement over the face of the protractor member. The protractor member may be calibrated in degrees and fractions thereof in the conventional manner, enabling angular measurements to be read by noting the position of the indicating portion of the indicator arm relative to the calibrations on the protractor member.

Angular measurements are made by aligning the indicator arm with the object measured after first setting the base member in some set position such as a true horizontal or true vertical position. Since the protractor member is transparent, slopes or grades may be measured by sighting the grade transversely across the arm from a station located to one side of the grade and aligning one of the longitudinal edge outlines of the indicator arm with the longitudinal outline of the grade as seen through the protractor member. If the indicator arm is comprised of an opaque or semiopaque material, a greater contrast is offered the eye along the longitudinal edge of the arm which aids in aligning the arm. By sliding the protractor member along the base member, the protractor member may be adjusted so that the indicator arm is aligned with the slope sighted without movement of the elongated base member. Thus the base member may be set in a true horizontal or vertical position and remain stationary during alignment of the indicator arm.

Slopes or grades may also be measured from a station situated at the base of the slope by sighting the slope longitudinally along the indicator arm from behind one end of the arm. Sights or markers at each end of the arm assist in sighting the arm when measurements are done in this manner. The measurements in this case are made by sliding the protractor member to one end of the base member so that the base member does not obscure sighting along the indicator arm.

The indicator arm is mounted on the front face of the protractor member and is manipulated by a handle assembly secured directly to the arm. Preferably, the handle assembly extends through a slot in the protractor member and rearwardly of the rear face of the protractor member. This permits manual adjustment of the arm without obstructing the front face of the protractor member. Structure is included confining movement of the protractor member to slidable movement longitudinally along the elongated base member and preventing movement of the protractor member laterally of the base member during adjustment of the indicator arm.

A more specific object of the invention, therefore, is to provide an instrument of the type described which comprises an elongated base member and a protractor member slidably mounted thereon, so arranged that angular measurements may be made without frequent adjustments of the position of the base member.

A further object is to provide such a mechanism wherein the protractor member is comprised of a transparent material enabling an object to be sighted by viewing the object directly through the protractor member.

Another object of this invention is to provide such an instrument which includes level-indicating means indicating true horizontal and vertical positioning of the base member.

Yet another object is to provide an instrument of the type described wherein the mechanism for adjusting the indicator arm comprises a handle assembly secured to intermediate portions of the indicator arm and extending rearwardly of the protractor member.

These and other objects and advantages are attained by the present invention described hereinbelow in conjunction with the accompanying drawings wherein:

Fig. 1 is a side view of the elongated base member and protractor member mounted together as they might be used according to this invention;

Fig. 2 is a top view of the instrument illustrated in Fig. 1;

Fig. 3 is an end view, viewing from right to left in Fig. 1;

Fig. 4 is an enlarged section view along the line 4—4 in Fig. 1;

Fig. 5 is an enlarged section view along the line 5—5 in Fig. 1; and

Fig. 6 is an enlarged section view along the line 6—6 in Fig. 1.

Referring to the drawings wherein an embodiment of this invention is illustrated, 10 indicates generally an elongated base member slidably mounting for movement longitudinally of the base member a protractor or plate member 11. Base member 10 has a substantially rectangular cross-section, as may best be seen in Fig. 3, save for grooves 12 and 13 formed along the sides of the base member to assist in the handling of the member. The lower surface 14 of the base member is planar so that the member lies evenly when supported on a flat surface.

Lying longitudinally along base member 10 intermediate the ends thereof is a spirit level or level indicator 16, and extending transversely of the base member at the right hand end of the member in Fig. 2 is a second spirit level or level indicator 17. Spirit level 16 is positioned parallel to lower face 14 of base member 10 and indicates true horizontal positioning of the instrument, whereas spirit level 17, which extends transversely of the instrument, indicates true vertical positioning of the instrument. In the embodiment illustrated, elongated base member 10 is comprised of a clear plastic, and the spirit levels are completely embedded within the body of the base member, the clear plastic enabling the levels to be viewable from outside the base member. By embedding the spirit levels in this manner, the levels are effectively shielded from inadvertent damage.

Carried by base member 10 at the left hand end thereof is a compass 18. Compass 18, as in the case of spirit levels 16 and 17, is also embedded within the body of the base member.

Protractor or plate member 11, which is comprised of a transparent or clear plastic to enable viewing through the plate member, has at one end thereof a flange 21 extending along the base of the protractor member. Flange 21 and portions of member 11 immediately adjacent flange 21 are slidably received within a runway 20 extending longitudinally along one side of base member 10. Runway 20 is comprised of a channel portion 22 and a constricted guide slot 23 laterally spaced from and joining with channel portion 22. Flange 21 is slidably mounted in channel portion 22 and serves to secure protractor member 11 from movement laterally out of base member 10. The shoulders defining guide slot 23 to either side of the guide slot hold the protractor or plate member in a vertical position relative to base member 10, as viewed in Fig. 3. Protractor or plate member 11 is slidable to any position on base member 10 or, if desired, may be completely separated from the base member by withdrawing the member longitudinally off one end of the base member.

Protractor member 11 carries along the outer edges thereof a series of calibrations normally indicating degrees or some fractions thereof.

Pivotally mounted adjacent the front face of plate member 11 by a pivot pin 26 is an indicator arm 27. The nonpivoted end of arm 27 moves in an arc graduated by the calibrations carried by the plate member. The nonpivoted end of the arm preferably carries some pointer device such as pointer 28, and projecting outwardly at the nonpivoted end of the arm is a marker 29. Carried at one end of pivot pin 26 is another marker 31. Markers 29, 31 assist in aligning arm 27 when an object is sighted longitudinally along the arm.

Intermediate the ends of indicator arm 27 is a handle assembly indicated at 32. The handle assembly extends through an arcuate slot 33 rearwardly of plate 11, slot 33 being arcuate about a center coincident with pin 26. The assembly includes a pair of washers 34 and 35 abutting each side of plate 11, a pin section 36, and a knob portion 37 carried by the assembly rearwardly of the rear face of plate 11. Washers 34 and 35 assist in holding down the free end of the indicator arm so that it lies flat against the front face of the protractor plate. When determining the slope of an object by sighting transversely across the arm and aligning the longitudinal outline of the object with the longitudinal edge of arm 27, the object is sighted by an observer positioned to the left of the instrument as viewed in Fig. 3. By positioning knob 37 rearwardly of protractor plate 11, arm 27 may be adjusted without interfering with the line of sight between an observer and indicator arm 27.

The instrument of this invention is extremely versatile. If desired, the protractor plate may be completely removed from elongated base 10 and the elongated base and protractor plate used independently of each other. When it is desired to make angular measurements using the instrument of this invention, the elongated base may either be supported manually or, if more accurate measurements are desired, the base may be mounted on a conventional tripod or similar device.

It is claimed and desired to secure by Letters Patent:

A geometric instrument for making angular measurements comprising an elongated base member, a level indicator mounted in said base member, a runway extending longitudinally along said base member, said runway comprising a channel portion and a constricted guide slot laterally spaced from and joined to said channel portion, a transparent plate member carrying a set of calibrations and slidably supported in said guide slot, said plate member having a flange portion slidably mounted in said channel portion whereby said plate member is secured in said runway from movement laterally from said channel portion, an indicator arm pivotally mounted on one side of said plate member, the nonpivoted end of said indicator arm moving in an arc graduated by the calibrations of said plate member, an arcuate slot in said plate member arcuate about a center coincident with the pivot center of said indicator arm, and a handle assembly affixed to said indicator arm for pivoting said arm, said handle assembly extending through and sliding within said arcuate slot, said handle assembly accommodating adjustment in the position of said indicator arm by manipulation of said arm on the other side of said plate member.

References Cited in the file of this patent

UNITED STATES PATENTS

| 1,088,394 | Bane | Feb. 24, 1914 |
| 1,145,050 | Yates | July 6, 1915 |
| 2,352,838 | Hurley | July 4, 1944 |
| 2,527,189 | Kittelson | Oct. 24, 1950 |
| 2,813,344 | Howland | Nov. 19, 1957 |

FOREIGN PATENTS

| 422 | Great Britain | Jan. 8, 1900 |
| 742,754 | France | Jan. 4, 1933 |